(12) United States Patent
Bazzo

(10) Patent No.: US 10,807,289 B2
(45) Date of Patent: Oct. 20, 2020

(54) SYSTEM AND METHOD FOR INJECTION MOULDING OF PLASTIC MATERIALS

(71) Applicant: INGLASS S.p.A., San Polo di Piave (Treviso) (IT)

(72) Inventor: Maurizio Bazzo, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 49 days.

(21) Appl. No.: 16/190,767

(22) Filed: Nov. 14, 2018

(65) Prior Publication Data

US 2019/0077062 A1 Mar. 14, 2019

Related U.S. Application Data

(62) Division of application No. 15/007,722, filed on Jan. 27, 2016, now Pat. No. 10,183,431.

(30) Foreign Application Priority Data

Jan. 28, 2015 (IT) .............................. TO2015A0059

(51) Int. Cl.
  *B29C 45/76* (2006.01)
  *B29C 45/28* (2006.01)
  (Continued)

(52) U.S. Cl.
  CPC .......... *B29C 45/7613* (2013.01); *B29C 45/13* (2013.01); *B29C 45/16* (2013.01);
  (Continued)

(58) Field of Classification Search
  CPC ......... B29C 45/16; B29C 45/77; B29C 45/13; B29C 45/7613; B29C 45/2806;
  (Continued)

(56) References Cited

U.S. PATENT DOCUMENTS 4,648,833 A 3/1987 Yamada
6,558,605 B1 * 5/2003 Wilson ................ B29C 45/0013
  264/328.13

(Continued)

FOREIGN PATENT DOCUMENTS

CN 1526538 A 9/2004
CN 902671 5/2007
  (Continued)

OTHER PUBLICATIONS

Chinese Office Action dated Jun. 3, 2019. 4 pages.
  (Continued)

*Primary Examiner* — Michael M. Robinson
(74) *Attorney, Agent, or Firm* — RMCK Law Group PLC

(57) ABSTRACT

A system and method for the injection moulding of plastic material through a plurality of injectors each having a pin valve displaceable in a controlled fashion between a closing position and an opening position by a respective actuator of an electronic control type, in which there is provided prompt activation of a preset function of changing a colour of the plastic material to be injected, actuated according to an optimized sequence which minimizes a number of moulding operations required to change the colour.

2 Claims, 2 Drawing Sheets

(51) Int. Cl.
 *B29C 45/77* (2006.01)
 *B29C 45/13* (2006.01)
 *B29C 45/16* (2006.01)
 *B29C 45/00* (2006.01)

(52) U.S. Cl.
 CPC .......... *B29C 45/2806* (2013.01); *B29C 45/77* (2013.01); *B29C 2045/0032* (2013.01); *B29C 2945/76698* (2013.01); *B29C 2945/76939* (2013.01); *B29K 2995/0021* (2013.01)

(58) Field of Classification Search
 CPC .. B29C 2045/0032; B29C 2945/76698; B29C 2945/76939; B29K 2995/0021
 See application file for complete search history.

(56) References Cited

U.S. PATENT DOCUMENTS

| | | | |
|---|---|---|---|
| 2003/0012845 | A1 | 1/2003 | Doyle et al. |
| 2004/0091569 | A1* | 5/2004 | Babin ................ B29C 45/1603 425/572 |
| 2005/0163883 | A1 | 7/2005 | Yang |
| 2012/0248652 | A1 | 10/2012 | Galati et al. |
| 2014/0300019 | A1* | 10/2014 | Moss ................ B29C 45/2703 264/40.7 |

FOREIGN PATENT DOCUMENTS

| | | |
|---|---|---|
| CN | 202053457 | 11/2011 |
| JP | H02214633 A | 8/1990 |
| JP | 2005297384 A | 10/2005 |
| WO | 1998022275 | 5/1998 |

OTHER PUBLICATIONS

German Office Action dated Jul. 9, 2019. 8 pages.
"Flexflow", Oct. 15, 2013, XP054975575, Retrieved from the Internet: URL: http://www.youtube.com/watch?v=G2-cv79Hpeg [retrieved on Oct. 27, 2014].
Italian Search Report and Written Opinion for Italian Application No. IT TO20150059 dated Sep. 22, 2015, 9 pages.
Japanese Office Action for Japanese Application No. 2016-014559 dated Dec. 19, 2017 with English translation 3 pages.
Lobers, H. et al., "Loecher Umspritzen", Plastverarbeiter, Huetig GmbH, Heidelberg, DE, vol. 49, No. 5, May 1, 1998, pp. 50-52, XP000765965, ISSN: 0032-1338.
Chinese Office Action dated Apr. 3, 2018, 5 pages.

* cited by examiner

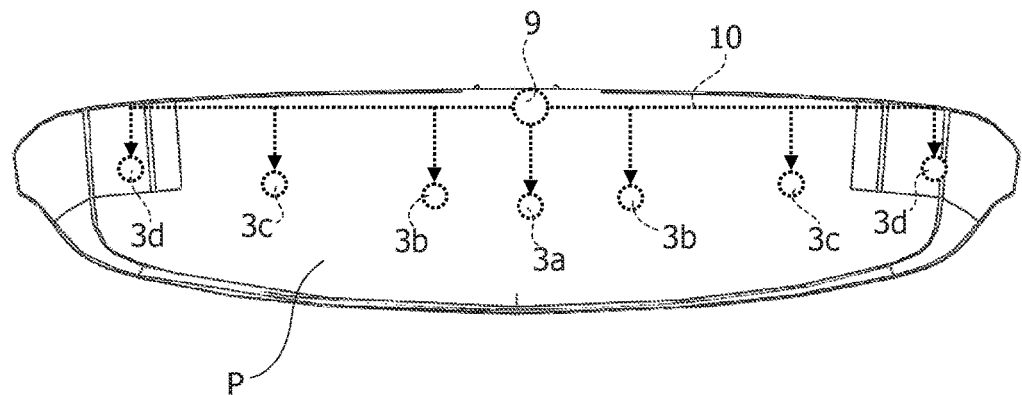
FIG. 2A
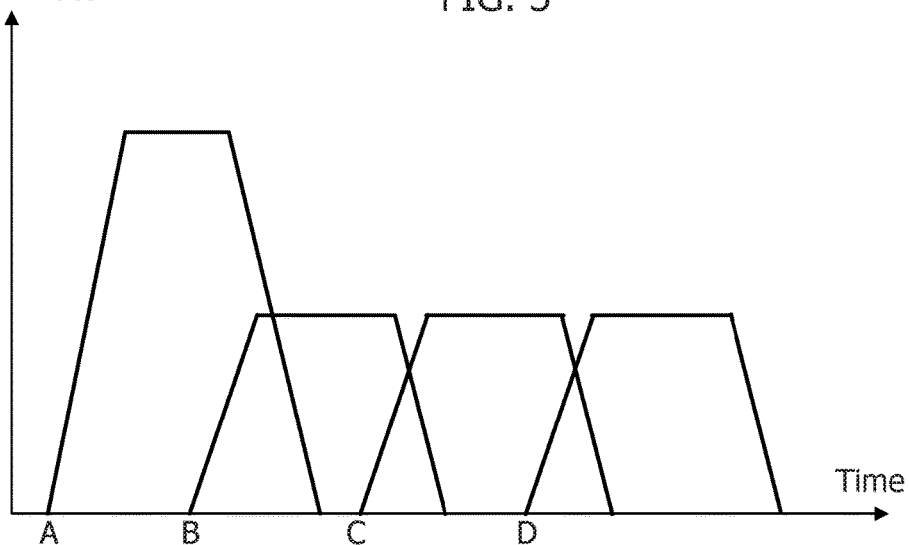
FIG. 3
FIG. 4
| Sequence | Process Parameters | Injectors A,B,C,D All Opened | Injectors B,C,D Opened - Injectors A Closed | Number of Molding Shots to Change Colour From Black to a Light Colour |
|---|---|---|---|---|
| 1 | 32 | 0 | 0 | 32 |
| 2 | 0 | 16 | 0 | 16 |
| 3 | 6 | 7 | 0 | 13 |
| 4 | 7 | 0 | 4 | 11 |
| | | | | |

SYSTEM AND METHOD FOR INJECTION MOULDING OF PLASTIC MATERIALS

CROSS REFERENCE TO RELATED APPLICATIONS

This application is a divisional of U.S. application Ser. No. 15/007,722 filed on Jan. 27, 2016, and claims priority to Italian Patent Application No. TO2015A000059 filed on Jan. 28, 2015, the entire disclosure of these applications is incorporated herein by reference.

FIELD OF THE INVENTION

The present invention refers to the injection moulding of plastic materials into the cavity of a mould, and more in particular it regards an injection moulding system including a dispenser of the plastic material and a plurality of injectors each having a pin valve displaceable between a closing position and an opening position for the introduction of plastic material under pressure into a cavity of the mould.

STATE OF THE PRIOR ART

The displacements of the pin valve of each injector are carried out through a fluid or electrical actuator: in the second case, as described and illustrated for example in document EP-2679374A1 on behalf of the Applicant, the electrical actuators are easily controllable with the aid of an electronic unit which operates according to process parameters for precisely and accurately controlling both the position and the speed of the pin valve during the movements thereof from the closing position to the opening position and vice versa. Such control is obtained both according to set cycles for example according to data detected during the injection process and through specific algorithms. The electronic unit may be similarly combined with fluid (hydraulic and pneumatic) actuators.

In the operation of the moulding system there often arises the need for changing the colour of the component to be moulded, thus necessarily implying preliminary operations for cleaning the plastic material dispenser and injectors. This leads to the inevitable production shut down and waste of a considerable amount of polymer: as a matter of fact, the cleaning, in the simplest form thereof, is carried out by setting the process parameters regarding the new colour and moulding a given number of components, subsequently discarded, up to attaining the desired aesthetic quality. It is thus fundamental to reduce the times and discarded material related to the change of colour in the large scale production.

In addition, setting the cycle sequence for opening the injectors to complete the change of colour is conventionally evaluated at the discretion of the operator and thus this is done manually by the operator in question, hence implying additional production shut-down times.

STATE OF THE ART

Document "LOECHTER UMSPRITZEN", Plastverarbeiter, Huething GmbH, Heidelberg, DE, Vol. 49, n° 5, Jan. 5, 1998, pages 50-52 describes, as regards the change of colour of the plastic material, a cycle referring to an injection moulding apparatus with three injectors actuated in a cascade or sequential fashion, which simply provides for the repetition of the normal sequential standard moulding cycle according to which the lateral injectors are opened first to fill the corresponding regions of the mould cavity and then, after an empirically established time, the central injector is also opened. When the flow of the plastic material introduced into the mould by the central injector reaches the two lateral regions, the two lateral injectors are closed.

Such repetition of the normal moulding sequential cycle would allow, according to this document, performing the colour change in 5-10 moulding operations. This possibility, simply declared without any experimental evidence, obviously depends on a series of parameters regarding:

dimensions of the piece to be moulded, (length of the supply channels and amount of the plastic material),
characteristics of the plastic material (viscosity, moulding temperature),
injectors (number, position, type, control method)
colour of the plastic material.

This document does not specify any of these parameters: considering the fact that the described colour change cycles do not differ from the sequential injection in any manner whatsoever, it should be basically deemed that the indicated 5-10 moulding operations must be with reference to the most favourable conditions (small pieces to be moulded, high viscosity and temperature of the plastic material, limited number of injectors, colour switch from yellow to white or vice versa).

As a matter of fact, it was basically proven that in case of considerably less favourable conditions (large pieces to be moulded such as for example vehicle panels or spoilers, low viscosity and temperature of the plastic material, high number of injectors, colour switch from black to white) the number of moulding operations with sequential standards required for changing colour is markedly higher, even in the order of several tens, with the ensuing long times and considerable waste of plastic material.

The Applicant devised and protected, through a series of patent applications yet to be published as of date of filing of the present application, specific and particular methods for controlling the pin valves of the injectors that allow, in particular in case of cascade or sequential injection, obtaining considerable improvement of the quality of articles thus moulded. Typically in the sequential injection the standard cycle provides for that some of the injectors, usually the most peripheral ones with respect to the mould cavity, inject a amount of plastic material lower than the one of the other injectors. Such difference in particular depends on the geometry of the dispenser and the injectors, i.e. the section and length of the channels through which the molten plastic reaches the various injection points. The amount also depends on the opening degree of the respective pin valves and the overall injection time.

SUMMARY OF THE INVENTION

The object of the present invention is to optimise the colour change process, even automating it, so as to considerably reduce the times required, and even significantly reduce the discarded materials and hence waste of plastic material.

The invention is based on acknowledging the fact that the control of the position and displacement speed of the pin valve of each injector at every instant, carried out through the activation of the relative actuator (electrical or fluid actuator) by the electronic control unit, may be favourably exploited for accelerating the colour change process.

This taken into account, the invention provides an injection moulding method as defined in the pre-characterising part of claim 1, whose distinctive characteristic lies in the fact that it provides for the prompt activation of a preset function of changing the colour of the plastic material to be injected, actuated according to an optimised sequence which consists in the complete opening of said some injectors (which inject a lower amount of material in a standard moulding cycle) to inject a maximum amount of plastic material for a limited number of injection cycles during which the other injectors (the ones that inject a higher amount of plastic material in a standard moulding cycle) remain closed, thus minimising the number of moulding operations required for changing the colour.

Thus, this distinctive method provides for allocating a higher amount to the injectors that dispense less in the standard cycle, thus basically inverting the typical situation of the standard moulding cycle.

The preset colour change shall be processed as a function of the various parameters obviously including the dimension and geometry of the articles to moulded, as well as the characteristics of the material and the number and position of the injectors provided for the moulding thereof. Once the electronic control unit of the injection apparatus is programmed with the aforementioned preset function, the colour change cycle may be simply recalled and activated by the operator, thus considerably saving time and reducing waste of plastic material.

The invention is particularly advantageous in case of sequential or cascade injection apparatus for moulding large articles such as for example vehicle body panels and the like in the automotive industry. In this case, the moulding apparatus comprises, in the known manner, first and second injectors respectively arranged at a generally central area and one or more generally peripheral areas of the mould cavity, and the injection of the plastic material is carried out by sequentially controlling the first and the second injectors so that the pin valves of the first injectors are displaced from the first closing position to the closing position before the pin valves of the second injectors, so as to progressively fill the mould cavity from the generally central area towards the generally peripheral areas. In this case, the preset colour change function according to the invention provides for maximising the amount of the plastic material through the complete opening of the relative pin valves while the first injectors remain closed. It has thus been proven by experiment that the number of moulding operations required for completing the colour change operation and attaining the desired aesthetic quality of the moulded articles is surprisingly reduced and minimised, passing from a few tens up to several units.

BRIEF DESCRIPTION OF THE DRAWINGS

The invention will now be described in detail, purely by way of non-limiting example, with reference to the attached drawings, wherein:

FIG. 2A is a front schematic view of the system of FIG. 2, FIG. 3 is a diagram representing, as a function of time, the amount plastic material exiting from the injectors represented in FIG. 2, and FIG. 4 is a table exemplifying the advantages of the invention.

DETAILED DESCRIPTION OF THE INVENTION

Figure 1:
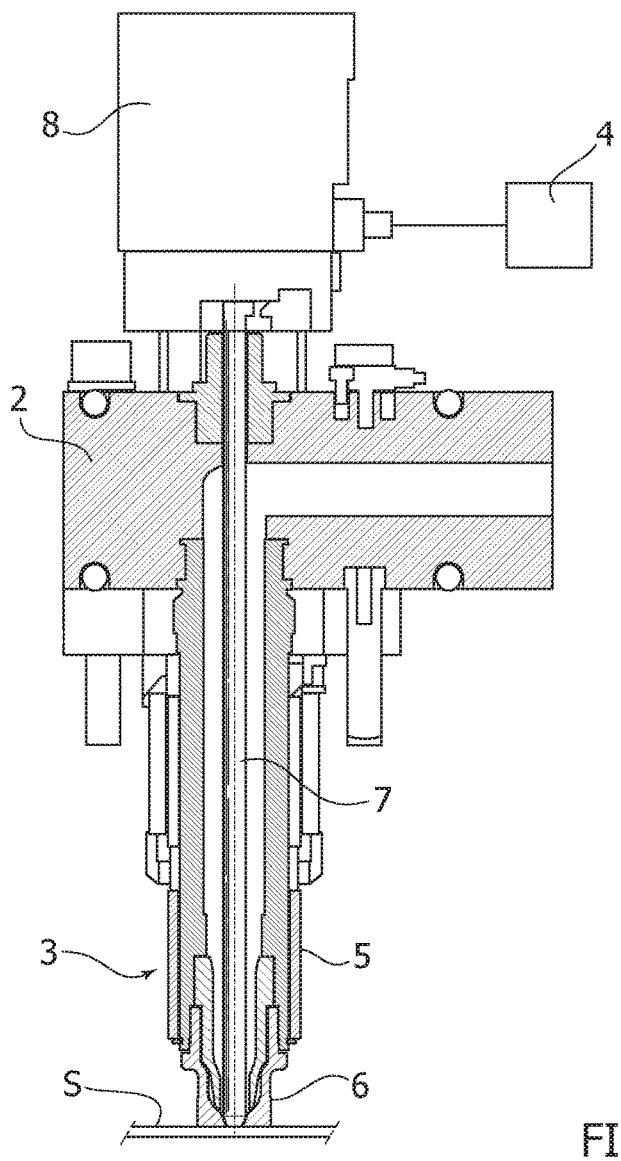
FIG. 1 is partial schematic view showing a part of an injection moulding system utilising the invention.

FIG. 1 schematically shows a part of a system for the injection moulding of plastic materials comprising, in a generally conventional manner, an injector 3 connected to a molten plastic material dispenser or hot chamber 2 and comprising a nozzle 5 provided at the free end thereof with a nozzle terminal 6 in communication with the cavity of a mould S through an injection gate. The flow of the plastic material through the nozzle terminal 6 is controlled by a pin valve 7 axially displaceable along the nozzle 5, through an actuator 8, between a lowered closing position, represented in FIG. 1, and a raised opening position.

The actuator 8 is, according to a preferred but non-limiting representation of the invention, an electrical actuator, and more in particular, a rotary electric motor: the arrangement thereof represented in FIG. 1 is provided purely by way of example, in that it can for example be of the type described and illustrated in the previously mentioned document EP-2679374A1 according to which the shaft of the rotary electric motor 8 drives the pin valve 7 through a transmission of the reversible type typically including a screw and nut group as well as an oscillating lever.

The electric motor 8 is operatively connected to a programmable control electronic unit 4 to actuate the pin valve 7 in a controlled fashion according to set cycles, as a function of various perimeters. In particular, the electronic unit 4 is programmed for actuating the pin valve 7 in a controlled fashion in terms of position and speed during the opening and closing of the injector 3.

Figure 2:
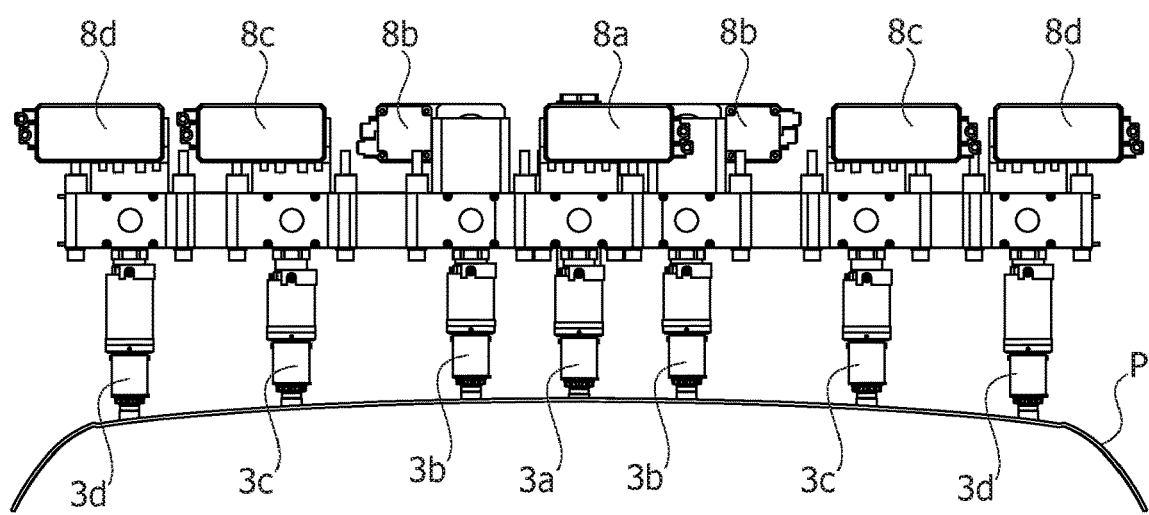
FIG. 2 is an elevational schematic view showing a configuration of the moulding system suitable for carrying out a sequential or cascade injection.

FIG. 2 schematically represents a known arrangement of the moulding system for obtaining large articles, such as for example vehicle panels P, by means of a cascade or sequential injection. The system exemplified in FIG. 2 comprises a plurality of injectors respectively indicated with 3a, 3b, 3c and 3d respectively positioned at a central area, intermediate area and terminal area of the mould cavity and actuated by respective rotary electric motors 8a, 8b, 8c and 8d controlled by the electronic unit 4.

FIG. 2A represents a front view of the moulding system of FIG. 2, from which there can be observed the geometry of the panel P and the arrangement of the injectors 3a-3d respectively at a central area, intermediate area and terminal area of the mould cavity S. In addition, there can also be observed channels 10 of the dispenser 2, through which the molten plastic is conveyed from the extension of the press nozzle 9 up to the single terminals 6 of the injectors 3. It is clear that the length of the channels 10 is variable as a function of the position of the injectors 3 and thus also shall be the amount of the material traversing them.

The chart of FIG. 3 represents a possible driving cycle of the electric motors 8a-8d regarding which the electronic unit 4 is programmed so as to perform the sequential injection. The diagrams indicated with A, B, C and D represent, as a function of time, the amount respectively exiting from the central injector 3a, the intermediate injectors 3b and 3c and the end injectors 3d. As observable from the chart, which only exemplifies, as mentioned, one of the possible cycles that can be actuated by the electronic unit 4, in the stage of filling the mould cavity the central injector 3a (diagram A) is opened first and a given amount, mainly depending on the degree of opening of the pin valve 7, is injected into the cavity. Upon completing the filling of the cavity allocated thereto, the central injector 3a starts closing up to reaching a zero amount value. The first intermediate injectors 3b simultaneously open up to reaching a maximum amount lower than the maximum amount reached by the central injector 3a and for example equivalent to about half the amount thereof (diagram B). Similarly to what has been illustrated above, upon completing the filling in proximity of the first intermediate injectors 3a, the latter are closed and simultaneously the second intermediate injectors 3c open, up to reaching maximum amount values always lower than the one initially reached by the central injector 3a and for example similar to the amount of the first intermediate injectors 3b (diagram C). Lastly, the cycle is similarly completed with the opening of the end injectors 3d (diagram D). The amount of the plastic material introduced into the mould cavity by the intermediate injectors 3b, 3c and the end injectors 3d is thus considerably lower than the one released by the central injector 3a and it is obtained by mainly acting on the opening positions of the single pin valves 7.

Given that the moulding system described above requires modifying the colour of the component to be moulded, a process for cleaning the dispenser 2 and the injectors 3a-3d should be carried out. This requires the moulding of a given number of components with the plastic material of the new colour, which are discarded until the required aesthetic quality is attained.

Thus, according to the distinctive characteristic of the invention, the electronic control unit 4 is designed, i.e. programmed, for the prompt activation of a preset colour change function, actuated according to an optimised sequence which minimises the required number of moulding operations. Such preset function is preferably determined with the aid of finite elements analysis and, in case of the example of sequential injection described herein, it provides for a limited series of injection cycles actuated with standard process parameters corresponding to those illustrated in the chart of FIG. 3, followed by a limited number of cycles in which the injectors characterised by the lower amount of the plastic material during the standard injection process, or the injectors 3b, 3c and 3d in this case, are completely opened moving the relative pin valves 7 to the maximum or total opening position while the injector 3a is kept closed.

As represented in the table of FIG. 4, this sequence allows completing the colour change, for example from black to a light colour, within only 11 moulding operations 7 of which are obtained with the standard process parameters and 4 with total opening of the injectors 3b, 3c, 3d keeping the injector 3a closed.

As observable from the table, this sequence—indicated with "4"—is considerably lower than the conventional sequence indicated with "1", in which there are typically provided for at least 32 moulding operations with the standard process parameters, and even considerably lower than the case where all injectors 3a-3d are completely opened for several moulding operations (sequence "2") for colour change and the case where a given number of moulding operations are carried out with the standard process parameters followed by other moulding operations with all the injectors 3a-3d open (sequence "3").

The method according to the invention obviously allows minimising both the time required to change colour and the discarded pieces until the required aesthetic quality is attained with the relative reduction of waste of plastic material.

The electronic control unit 4 may be programmed with various preset colour change functions, for example according to the number of injectors and dimensions of the components to be printed, which may be promptly recalled and activated automatically without requiring further interventions by the operator, up to completion thereof.

The preferred but non-limiting use of electrical actuators has the further advantage of being able to accelerate the removal of residual material from the terminal area 6, which is particularly critical in the colour change process. As a matter of fact, the injector is opened to a minimum level, so that the injection pressure in proximity of the lower end of the pin valve 7 is extremely high and the removal of the residual material is thus easier.

Obviously, the construction details and the embodiments of the moulding system may widely vary with respect to what has been described and illustrated, without departing from the scope of protection of the present invention as described in the claims that follow.

The invention claimed is:

1. A system for the injection molding of plastic material through a plurality of injectors each having a valve pin displaceable in a controlled fashion between a closing position and an opening position by a respective electronically controlled actuator according to set cycles, the system comprising:
    an electronic control unit configured to activate a preset function of changing a color of the plastic material to be injected, actuated according to a color changing sequence different from a standard injection cycle,
    said set cycles including the standard injection cycle wherein some of the plurality of injectors inject an amount of plastic material lower than a maximum amount and lower than that of other of the plurality of injectors which inject a lesser amount of material as compared to the some of the plurality of injectors;
    the color changing sequence including a complete opening of said some of the plurality of injectors to inject a maximum amount of plastic material for a limited number of injection cycles during which the other of the plurality of injectors remain closed, so as to reduce a number of molding operations required to change the color as compared to using the standard injection cycle to change the color of the plastic material to be injected.

2. The system according to claim 1, wherein the actuators are electrical actuators.

* * * * *